US006792556B1

(12) United States Patent
Dennis (10) Patent No.: US 6,792,556 B1
(45) Date of Patent: Sep. 14, 2004

(54) BOOT RECORD RECOVERY (75) Inventor: Lowell B. Dennis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 485 days.

(21) Appl. No.: 09/583,940

(22) Filed: May 31, 2000

(51) Int. Cl.[7] .............................................. G06F 11/00
(52) U.S. Cl. ............................................ 714/6; 714/36
(58) Field of Search ..................... 714/6, 36; 711/162; 713/2

(56) References Cited

U.S. PATENT DOCUMENTS

| | | | |
|---|---|---|---|
| 5,509,120 A | | 4/1996 | Merkin et al. .............. 395/186 |
| 5,537,540 A | * | 7/1996 | Miller et al. ................. 714/38 |
| 5,598,531 A | | 1/1997 | Hill ............................. 395/186 |
| 5,604,862 A | * | 2/1997 | Midgely et al. ............... 714/6 |
| 5,793,943 A | * | 8/1998 | Noll ............................. 714/6 |
| 5,944,821 A | | 8/1999 | Angelo ....................... 713/200 |
| 6,016,546 A | | 1/2000 | Kephart et al. ............. 395/186 |
| 6,021,510 A | | 2/2000 | Nachenberg ................. 714/38 |
| 6,098,158 A | | 8/2000 | Lay et al. ................... 711/162 |
| 6,240,519 B1 | * | 5/2001 | James et al. ................ 713/202 |
| 6,308,265 B1 | * | 10/2001 | Miller ........................... 713/2 |
| 2003/0014619 A1 | * | 1/2003 | Cheston et al. ............... 713/1 |

OTHER PUBLICATIONS

Marc Alexander and Jay Baxter; *BIOS–Level Floppy Boot–Sector Virus Prevention*; Filed Jan. 25, 2000; U.S. Ser. No.: 09/490,940. (Copy Not Enclosed).

Donald Carroll; *Disk Boot Sector For Software Copyright Enforcement*; Filed Jun. 12, 1996; U.S. 08/662,879. (Copy Not Enclosed).

* cited by examiner

*Primary Examiner*—Scott Baderman
*Assistant Examiner*—Joshua Lohn
(74) *Attorney, Agent, or Firm*—Haynes and Boone, LLP (57) ABSTRACT

A method, computer system, and apparatus perform boot record recovery. When the boot record is known to be free, a snapshot copy of the boot record is stored in non-volatile memory. On boot-up, the current boot record is compared with its corresponding snapshot. If relevant differences exist between the two (indicating that the boot record has been modified), a message is reported to the user. The user may opt to boot from (optionally updating the snapshot) the modified boot record, or boot from (optionally restoring the boot record) the stored snapshot.

37 Claims, 4 Drawing Sheets

BOOT RECORD RECOVERY

BACKGROUND

This disclosure relates generally to computer systems and, more particularly, to a method and system for detecting, and recovering from, computer viruses during the boot process.

A problem encountered by many users of computer systems is the inadvertent introduction of computer viruses into the computer system. These computer viruses can cause unrecoverable errors and can have a large detrimental economic impact on the owner of the computer system. Computer viruses are computer programs or pieces of computer code that are loaded onto the computer system without the user's knowledge and that operates against the user's wishes. Technically, a computer virus is capable of replicating itself. Some people distinguish between general viruses and worms. A worm is a special type of virus that can replicate itself and use memory, but cannot attach itself to other programs.

A similar type of destructive computer program is known as a Trojan horse. A Trojan horse masquerades as a benign application, such as a utility application. Unlike a virus, a Trojan horse does not replicate itself, however, Trojan horse programs can be just as destructive as computer viruses. For example, a particularly insidious type of Trojan horse masquerades as a program to rid a computer system of viruses, but instead introduces viruses onto the computer system. As used herein, the term "computer virus" is used to collectively refer to any type of inadvertently-introduced destructive computer code on a computer system, including viruses, worms, and Trojan horses.

In order to detect these harmful programs and code, virus detection programs have become increasingly available. These virus detection programs generally search the memory of a computer system to detect known computer viruses. The programs notify the user of a computer system when a potential virus is located, and many such programs remove any viruses that are found. In addition, most virus detection programs include an auto-update feature that enables the program to download profiles of new viruses so that the program can check for new viruses as soon as they are discovered.

A virus detection program usually contains two parts: a scanner and a file containing virus "signatures". The virus signatures are unique characteristics that identify specific viruses. A further description of antivirus scanners and signatures is set forth in U.S. Pat. No. 6,016,546, issued to Kephart et al., and entitled "Efficient Detection of Computer Viruses and Other Data Traits", which is herein incorporated by reference in its entirety. Generally, each time a new virus is discovered, the author of the virus-detection program must create a new virus signature that tells the scanner how to recognize the new virus. Because new viruses appear at a relatively rapid pace, anti-virus scanners are potentially ineffective against new viruses whose "signatures" have not been loaded into the signature file.

Many virus authors design computer viruses to acquire control of the computer system before the computer system's operating system has a chance to run any virus detection programs. This is accomplished by designing the virus to infect the boot record of the system's bootable media. For the purposes of this document a boot record shall refer to either the Master Boot Record ("MBR") associated with fixed media devices or the boot sector associated with removable media devices. Additionally, the terms hard disk and floppy disk shall be interpreted to mean any fixed or removable media respectively. A boot record virus is a common type of virus that replaces the boot record with its own code. Because the boot record executes every time a computer system is booted from a hard disk, a boot record virus is extremely dangerous to the integrity of a computer system.

Typical approaches to dealing with boot record viruses include write protection and virus detection programs. In the write protection approach, the contents of the boot record may only be read but may not be modified, thus inhibiting infection by a boot record virus. A drawback to the write protection approach, however, is that it can be easily circumvented. That is, the write protection approach usually works by having code in the BASIC input/output system ("BIOS") enforce the prohibition on writing to the boot record. This works to prevent contamination when the virus attempts to use BIOS routines for accessing the boot record, but is circumvented when the infecting program writes directly to the hardware. Another pitfall of the write protection approach is that it potentially inhibits useful processing within the computer system. Some software applications, such as boot loaders and managers and media formatters legitimately, need to write to the boot record. In order for such applications to operate properly, the "write protection" for the boot record must be disabled, leaving the boot record vulnerable to infection.

Virus detection programs that are designed to detect boot record virus infection typically provide notification but do not generally provide for recovery from the virus. One such virus detection scheme is presented in U.S. Pat. No. 5,509,120, issued to Merkin et al., and entitled "Method and System for Detecting Computer Viruses During Power On", which is herein incorporated by reference in its entirety. Merkin '120 discloses a scheme that computes an "uncontaminated" cyclic redundancy check ("CRC") of the MBR and of the operating system boot record when both are known to be free of viruses. During each boot, the computer system performs a validity check by computing the CRC of the operating system and master boot records and then comparing these CRC's with the uncontaminated CRC's. If actual and uncontaminated CRC's do not match, an error message is displayed to alert the user of possible virus contamination.

What is needed is a more robust virus detection scheme that not only detects all boot record viruses, even new ones, that may infect a boot record, but that also allows the boot record to recover from a virus infection. Ideally, the virus detection scheme would allow the boot record to be modified when legitimately required.

SUMMARY

A method, computer system, and apparatus perform boot record recovery. In at least one embodiment, a method of operating a computer system comprises determining whether a boot record is virus-free. The boot record is identified as "clean" if it is determined to be virus-free. The snapshot of the clean boot record is stored in non-volatile memory. During the boot process, the contents of the current boot record are compared with the contents of the snapshot to determine whether a mismatch exits in at least one embodiment, this processing occurs after POST. If a mismatch does not exist, the contents of the current boot record are executed as part of the IPL process. In at least one embodiment, the determining whether a boot record is virus-free includes obtaining a user input from the user of the computer system. In at least one embodiment, the current boot record resides in volatile memory.

At least one embodiment of the method further comprises reporting a message to the user if a mismatch exists between the current boot record and the snapshot. A mismatch occurs when relevant information has been altered in the current boot record. In at least one other embodiment, the contents of the snapshot are executed if the mismatch exists.

Alternatively, the user provides an input that is received as a proceed indicator. If the user-provided value in the proceed indicator is a first value, then the contents of the snapshot are executed during the IPL, thereby effecting a recovery of the boot record with the clean snapshot. On the other hand, if the user-provided value in the proceed indicator is a second value, then the contents of the current boot sector are executed during the IPL. This situation will occur when the user is aware of; and comfortable with, the change to the current boot record.

In at least one embodiment, the current boot record is restored by copying the contents of the snapshot to the current boot record if the mismatch exists. Alternatively, at least one other embodiment provides that the contents of the snapshot are overwritten with the contents of the current boot record if the mismatch exists. In at least one other embodiment, a user input is used to determine which of the prior two approaches to adopt. That is, if the contents of a proceed indicator are a first value, then the contents of the snapshot are overwritten with the contents of the current boot sector.

In at least one embodiment, a computer system that performs virus detection and recovery comprises a process and a BASIC input/output system (BIOS) coupled to the processor. The BIOS memory includes a module that determines whether a boot record is virus free and a module that, if the boot record is virus-free, identifies the boot record as a clean boot record. The BIOS memory also includes a module that stores a copy of the clean boot record in a non-volatile memory to create a snapshot. The BIOS memory also includes a module that compares the contents of a current boot record with the snapshot to determine if relevant discrepancies exist, resulting in a mismatch. If a mismatch exists, another module in the BIOS executes the contents of the current boot record. At least one embodiment of the module that determines whether the boot record is virus-free receives a user input. In at least one embodiment, the user input is an indication of whether the user believes the boot record to be virus-free.

In at least one embodiment, an apparatus that performs virus detection and recovery comprises a computer-readable medium having a computer program accessible therefrom. The computer program includes a module that determines whether a boot record is virus free. The computer program also includes a module that identifies the boot record as a clean boot record if it is determined to be virus-free. Another module stores a copy of the clean boot record in a non-volatile memory to create a snapshot of the clean boot record. Another module compares the contents of a current boot record with the snapshot to determine whether a mismatch exists. Another module executes the current boot record if the mismatch exists. One skilled in the art will recognize that the modules on the computer-readable medium may be separate software programs or may simply be logically distinct portions of the same software program.

In at least one embodiment, the computer-readable medium is a BIOS memory. In another embodiment, the computer-readable medium is any floppy disk, hard disk, or any other non-volatile storage medium.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out embodiments of the disclosure. The description is intended to be illustrative of the embodiments and should not be taken to be limiting.

Figure 1:
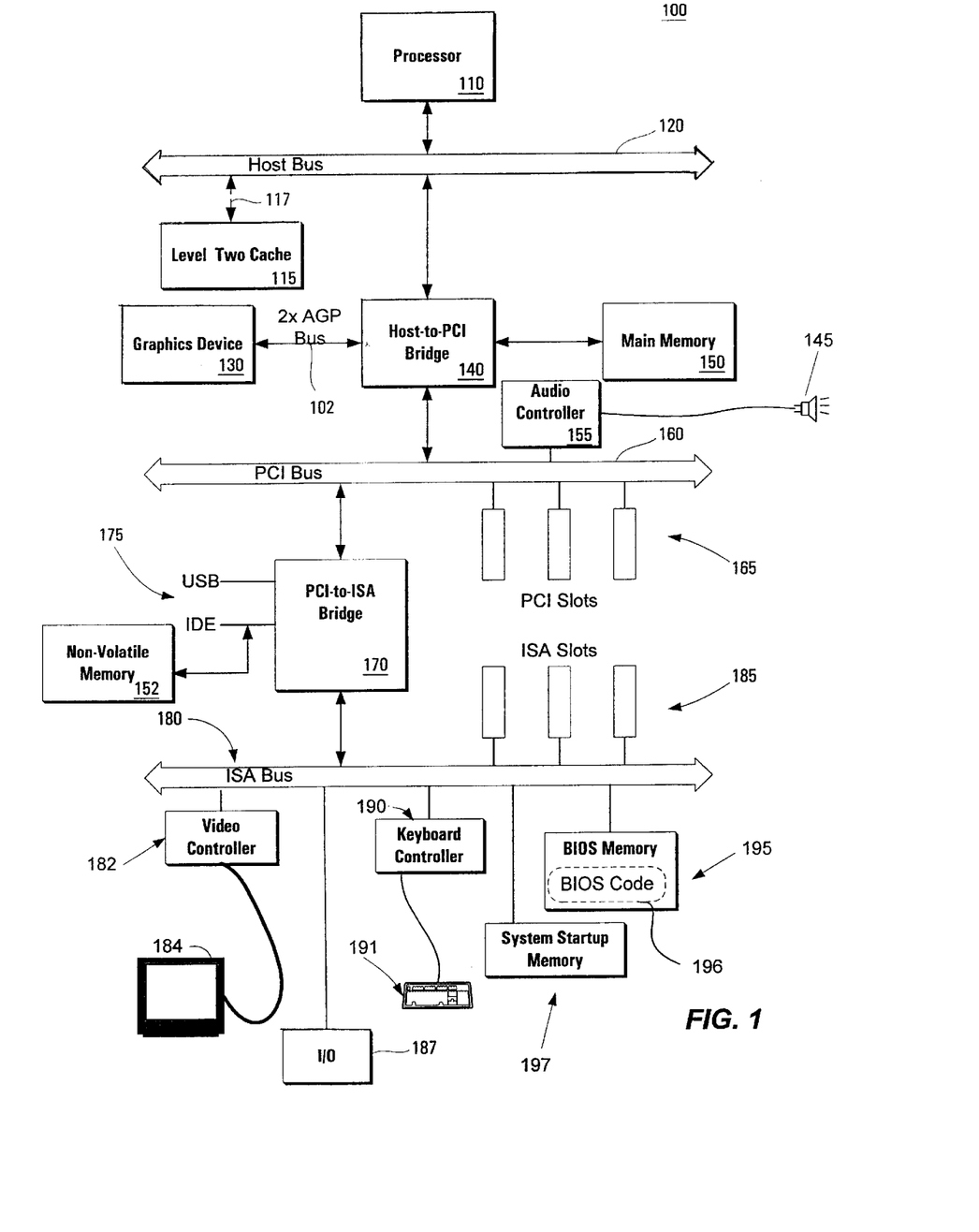
FIG. 1 is a block diagram illustrating an exemplary computer system.

FIG. 1 is a block diagram of an exemplary computer system 100. The computer system 100 may be found in many forms including, for example, mainframes, minicomputers, workstations, servers, personal computers, internet terminals, notebooks and embedded systems. Personal computer (PC) systems, such as those compatible with the x86 configuration, include desktop, floor standing, or portable versions. A typical PC computer system 100 is a microcomputer that includes a microprocessor (or simply "processor") 110, associated main memory 150 and control logic and a number of peripheral devices that provide input and output for the system 100. A typical computer system 100 may also include a cache 115 to facilitate quicker access between the processor 110 and main memory 150. The peripheral devices often include speaker systems 145, keyboards 191, and traditional I/O devices that often include display monitors 184, mouse-type input devices, floppy disk drives, hard disk drives 152, CD-ROM drives, modems, and printers. A typical computer system also includes a BIOS memory 195 on which the software modules known as the BASIC Input/Output System (BIOS) 196 are stored. The BIOS memory is a non-volatile memory, such as ROM or flash memory. The number of I/O devices 187 being added to personal computer systems continues to grow. For example, many computer systems also include network capability, terminal devices, televisions, sound devices, voice recognition devices, electronic pen devices, and mass storage devices such as tape drives, CD-R drives or DVDs. The peripheral devices usually communicate with the processor over one or more buses 120, 160, 180, with the buses communicating with each other through the use of one or more bridges 140, 170.

One skilled in the art will recognize that the foregoing components and devices are used as examples for sake of conceptual clarity and that various configuration modifications are common. For example, the audio controller 155 is connected to the PCI bus 160 in FIG. 1, but may be connected to the ISA bus 180 or other appropriate I/O buses in alternative embodiments. As further example, processor 110 is used as an exemplar of any general processing unit, including but not limited to multiprocessor units; host bus 120 is used as an exemplar of any processing bus, including but not limited to multiprocessor buses; PCI bus 160 is used as an exemplar of any input-output devices attached to any I/O bus; AGP bus 102 is used as an exemplar of any graphics bus; graphics device 130 is used as an exemplar of any graphics controller; and host-to-PCI bridge 140 and PCI-to-ISA bridge 170 are used as exemplars of any type of bridge. Consequently, as used herein the specific exemplars set forth in FIG. 1 are intended to be representative of their more general classes. In general, use of any specific exemplar herein is also intended to be representative of its class, and the non-inclusion of such specific devices in the foregoing list should not be taken as indicating that limitation is desired.

One or more executable computer software module(s) 196 contained in BIOS memory 195 may perform the machine-executed method of the present disclosure. Actual implementation of such computer code might be executable, for example, on a Dell PC based on the Intel 80x86 or Pentium™ microprocessors, or on other suitable processor-based computer systems. The BIOS code 196 (sometimes referred to herein simply as "the BIOS") contains, among other things, software modules, or "routines", that test the computer system 100. These diagnostic routines, sometimes collectively referred to as the Power On Self Test ("POST"), typically execute when power is supplied the computer system 100. One skilled in the art will recognize that BIOS routines may be performed by software modules, or may be implemented as hardware modules firmware modules, or any combination thereof.

During the POST diagnostics routines, the BIOS 196 runs through all the known components of the computer system 100—such as the processor 110, the memory 150, the keyboard 191, and so on—to test and determine whether they are operating properly. If the BIOS diagnostics run properly, the BIOS code 196 may execute the Initial Program Load ("IPL"). The IPL is the process of transferring control of the computer system 100 from the BIOS code 196 to the operating system.

Figure 2:
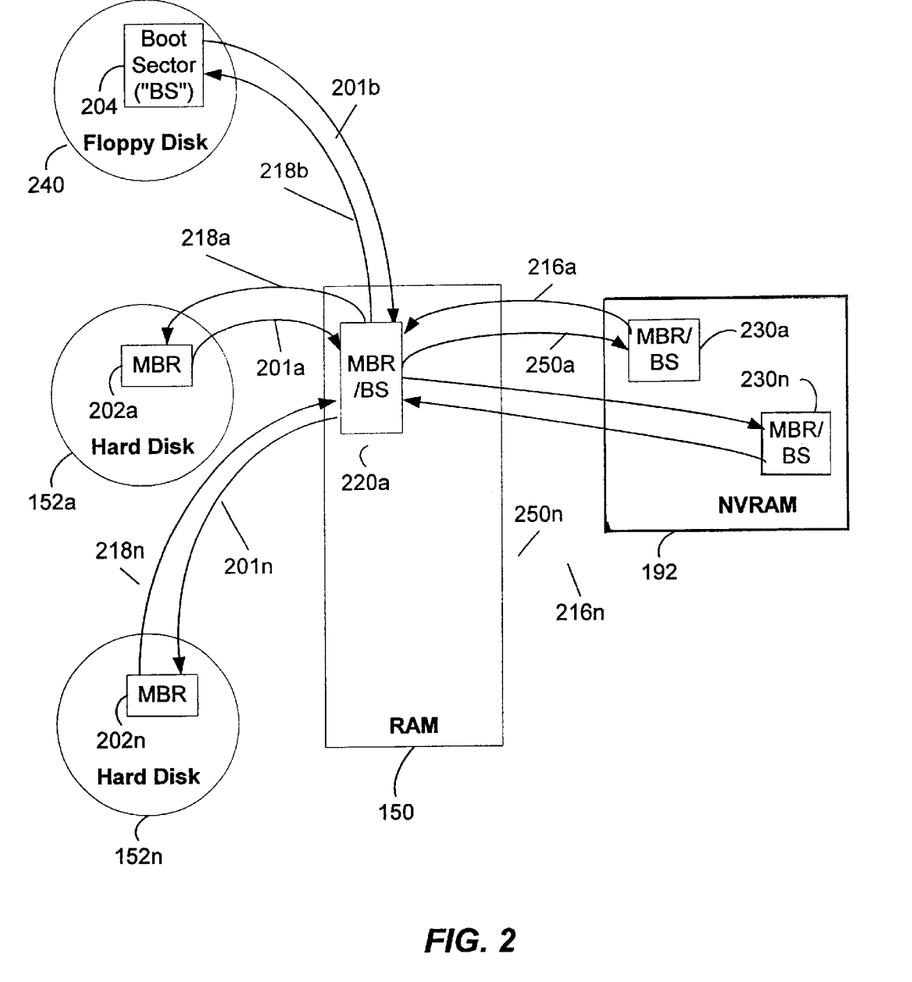
FIG. 2 is a block diagram illustrating the data flow during recovery of the information in a boot sector.

FIG. 2, in conjunction with FIG. 1, illustrates that, during a typical IPL, the computer system 100 loads the boot record into system memory 150. In at least one embodiment, the system memory 150 is volatile Random Access Memory (RAM). In order to load the operating system, the BIOS 196 contains a short code routine, called a BIOS boot loader, at the end of the BIOS POST test procedures. Modem BIOS boot loaders will attempt to boot from a sequence of bootable devices. This sequence, know as the "boot order" or "boot sequence", is usually a configurable option which can vary depending on the number and type of bootable devices connected to the system 100. The BIOS boot loader starts by checking to see if the first device contains bootable media; if it does, that media's boot record is loaded and executed. If not the BIOS boot loader repeatedly proceeds to the next device until bootable media is found, loaded, and executed or until the boot sequence is exhausted.

When booting from removable media, such as a floppy disk 240, the BIOS boot loader reads the contents of the boot sector, which is typically the first sector on the media, into system memory 150 and then executes it. The boot sector code typically looks for, loads, and executes operating system files at a prescribed location on the media.

In contrast to removable media, which contains a single boot sector, fixed media, like a hard disk 152, may contain several boot sectors and a Master Boot Record 202. In modem computer systems, fixed media may be partitioned into various logical drives, such as C:, D: and E: drives. The user of the computer system may desire that one or more logical drives boot with a different operating system than the others. In order to facilitate this differentiation among logical drives, each of the partitions contains a boot sector. Fixed media also contain a Master Boot Record 202. The Master Boot Record 202 typically resides on the first sector of the fixed media.

Figure 3:
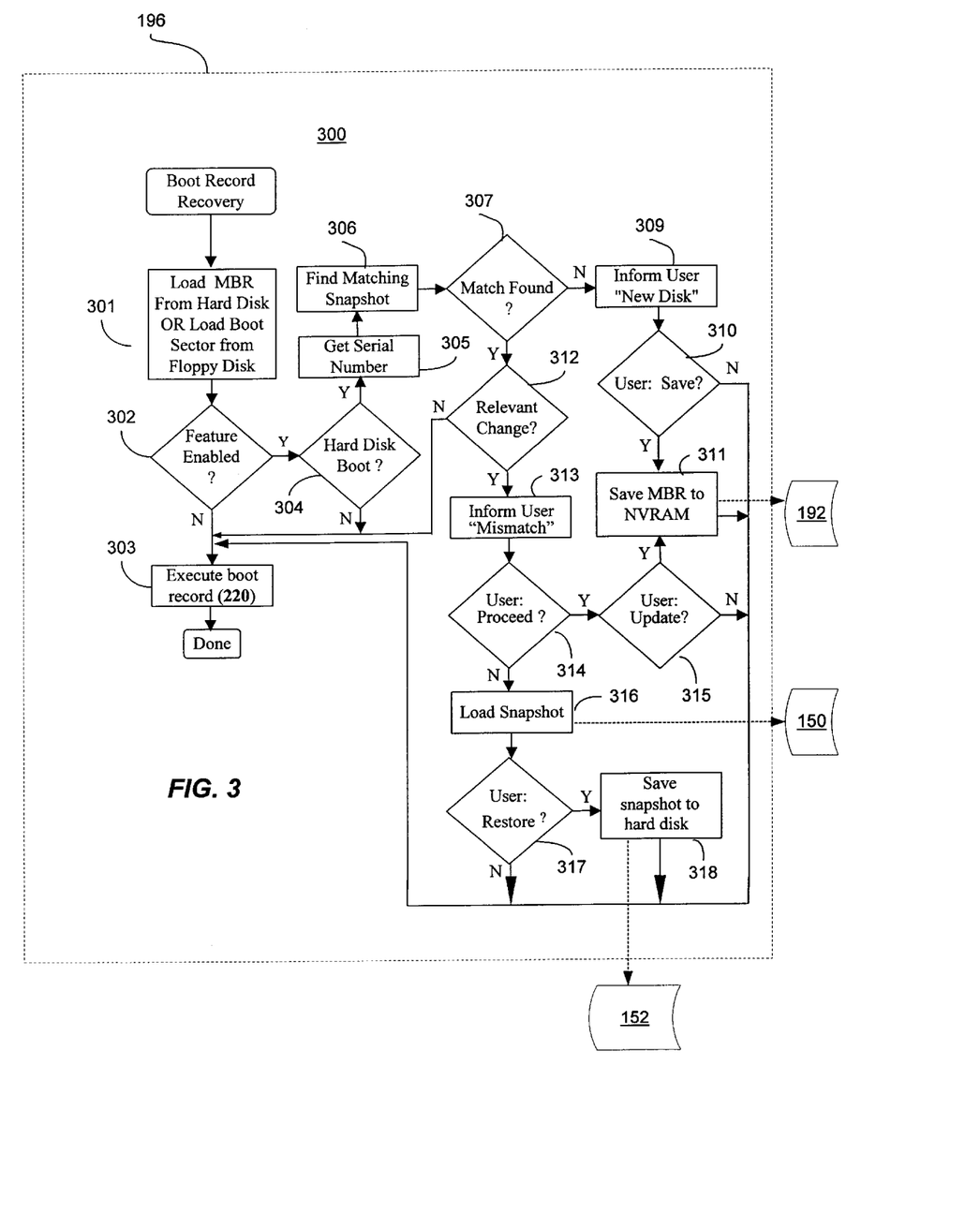
FIG. 3 is a flow chart illustrating MBR recovery according to at least one embodiment.

FIGS. 2 and 3 illustrate that, during IPL of a boot from a hard disk 152 (or other fixed media), the BIOS 196 loads the contents of the MBR 202 into a specific location in system memory 150. For a boot from a floppy disk 240 (or other removable media), the BIOS 196 loads the contents of the boot sector 204 from the floppy disk to the specific location in memory 150. This initial loading action is reflected in operation 301 in FIG. 3 and is also reflected as data transfer 201 in FIG. 2. After the MBR 202 or floppy disk boot sector 204 is loaded into system memory, the BIOS executes the code in the system memory copy 220 of the Master Boot Record 202 or floppy disk boot sector 204. In the case of a hard disk boot, the MBR code 220 begins the IPL process by looking up a table, called the partition table, that is stored on the hard disk 152. By looking at the partition table, the MBR code 220 determines which logical partition is the active partition that should be used for booting.

Turning to FIG. 2, the code in a boot sector either on a floppy disk 240 or in the active partition of a hard disk 152 is code that provides for loading certain initial system files that make up the beginning portions of the operating system to be invoked for the particular partition. In a typical computer system that operates under a Windows™ operating system, these initial system files constitute the IO.SYS and MSDOS.SYS files. The BIOS boot loader copies the boot record to a specific location in system memory 150. For a hard disk 152, the BIOS boot loader loads the MBR 202, which, when executed, load the boot sector for the active partition.

After the BIOS boot loader has loaded the proper boot record into system memory 150 at a particular address, the BIOS 196 passes control to the boot record by branching to the particular address. In a typical computer system, the boot record is loaded at the hexadecimal address 7C00. In this manner, the BIOS boot loader loads the boot record into system memory 150 and then executes it. The boot record then determines how to find the rest of the operating system. The initial system files assume control of the boot process and load the rest of the operating system into system memory 150.

FIG. 3 is a flow chart illustrating the flow of control in at least one embodiment 300 of the present disclosure. Because the BIOS 196 loads and executes the boot record, the BIOS 196 is in a position to verify and "repair" the contents of the boot record 220 in system memory 150 and, if desired by the user, on the booting media. In at least one embodiment, therefore, the present disclosure is implemented as a detection and recovery module 300 in the BIOS code 196. One skilled in the art will recognize, however, that the present disclosure may be implemented as a series of software modules, rather than a single module, that can be executed in any portion of memory in the computer system 100, including system memory 150 and BIOS memory 195. The present disclosure can be implemented as software instructions on a computer-readable tangible medium such as any magnetic storage medium, including disk and tape storage medium; an optical storage medium, including compact disk memory and a digital video disk storage medium; a non-volatile memory storage memory; a volatile storage medium; or data transmission medium including packets of electronic data and electromagnetic waves modulated in accordance with the instructions. One skilled in the art will further recognize that the present disclosure may be implemented as software modules, hardware modules, firmware modules, or any combination thereof.

FIGS. 2 and 3 illustrate the logical flow and the data flow of the present invention. The detection and recovery module 300 loads, in operation 301, the contents of the boot sector (from a floppy disk 240 or other removable media) or the MBR 202 (from a hard disk 152 or other fixed media) into system memory 150. The copy 220 of the boot record now residing in system memory 150 will hereinafter be referred to as the current boot record 220. In operation 302, the BIOS determines whether the user of the computer system 100 has selected that the recovery feature be enabled. In at least one embodiment, this may be implemented by allowing the user to select the recovery feature in the setup module of the BIOS 196. The user selection is retained in memory for use by the BIOS 196. For example, the user selection regarding the recovery feature is stored, in at least one embodiment, in the system startup memory 197 (FIG. 1).

Referring to FIG. 1, the system startup memory 197 is a non-volatile memory containing vital setup information used by the BIOS 196. In at least one embodiment, the system startup memory 197 is a special, small block of battery-backed complementary metal oxide semiconductor ("CMOS") memory. Because CMOS memory is volatile, the battery keeps the system startup memory 197 fresh.

FIG. 3, in conjunction with FIG. 2, illustrates that, if the BIOS 196 determines in operation 302 that the user has not enabled the recovery feature, then the BIOS 196 executes the code in the current boot record 220 in operation 303. Otherwise, the BIOS 196 determines in operation whether the current boot is a boot from the hard disk 152 or other fixed media. If not, then the BIOS 196 executes the code in the current boot record 220 in operation 303. In other words, in at least one embodiment 300, the recovery feature only enables recovery of the MBR 202 during a fixed media boot and does not provide recovery of removable media boot sector 204, since most users of modern computer systems routinely boot from a hard disk 152 rather than a floppy disk 240.

If the BIOS 196 determines in operation 304 that the current boot is a boot from the hard disk 152 or other fixed media, the BIOS 196 then performs processing that allows the detection and recovery module 300 to perform recovery for multiple hard drives. In order to differentiate among multiple hard drives, the BIOS 196 performs operation 305. In operation 305, the BIOS obtains and stores the serial number of the hard disk 152 or other fixed media being booted from. This feature allows the detection and recovery module 300 to perform properly even if a user changes out one hard disk 152 or fixed media for another, and also allows the detection and recovery module 300 to perform properly when the user routinely boots from any of several different hard disks 152a–152n within the same computer system 100 (FIG. 1). In operation 305, the BIOS initiates one or more input/output (I/O) commands to the hard drive 152, commanding the hard drive to identify itself.

Using the serial number obtained from the hard disk 152 or other fixed media, the BIOS 196 then executes operation 306. In operation 306, the BIOS 196 searches a particular portion of non-volatile memory 192 to determine whether a "snapshot" image 230 of the MBR 202 has been previously stored in the non-volatile memory 192. In at least one embodiment, the non-volatile memory location for storing the snapshots is located in flash RAM (random access memory) utilized by the BIOS 196, such as the area where Extended System Configuration Data is stored in the BIOS memory 195. One skilled in the art will recognize that any type of non-volatile storage medium will suffice for storage of the snapshots. A snapshot is a clean copy of the MBR that is known to be virus-free.

After searching the non-volatile memory 192, the BIOS 196 determines in operation 307 whether a snapshot 230 corresponding to the serial number of the hard drive 152 or other fixed media has been found. If the BIOS 196 has not located a snapshot 230 corresponding to the serial number of the booting hard disk 152 or other fixed media, then the booting hard disk 152 is assumed to be a newly installed hard disk 152. In such case, the BIOS 196 executes operation 309. In operation 309, the BIOS 196 displays a message to the user of the computer system 100 (FIG. 1) to notify the user that the current booting hard disk 152 is a "new disk" that does not have a corresponding snapshot of its MBR 230 stored in non-volatile memory 192.

The BIOS 196 then queries the user, in operation 310, to determine whether the user knows that the hard disk is virus-free. This inquiry is relevant to the detection and recovery module's 300 ability to perform recovery of corrupted MBR's. In order to do so, the BIOS 196 must store a "clean" copy of the MBR in non-volatile memory 192. If the user indicates in operation 310 that the MBR is "clean", then it is safe for the BIOS 196 to take a snapshot of the clean MBR 202 to use as a back-up in case the MBR 202 subsequently becomes corrupted. If the user indicates that the MBR 202 on the booting hard disk 152 or other removable media is clean, the BIOS 196 then queries the user, in operation 310, whether the user desires a snapshot of the clean MBR 202 to be stored in non-volatile memory 192.

In an alternative embodiment, the BIOS 196 performs only a single query in operation 310. That is, the BIOS 196 queries the user regarding whether the user wishes to store a snapshot of the new hard disk 152. If the user indicates that he wishes to save a snapshot 230, then it is assumed that the user knows that the MBR 202 of the new disk is clean. The BIOS 196 thus determines that the MBR 202 is clean if the user indicates that he wishes to store a snapshot 230 of the MBR 202. In this embodiment, it is necessary that the user choose to save a snapshot 230 only when the MBR 202 is known to be clean.

The storage of a snapshot to perform recovery for corrupted MBR's 202a–202n provides a distinct advantage to user of computer systems. Many virus-detection, programs can detect a corruption in the MBR 202 by performing a CRC or checksum of the MBR 202. This approach allows for detection of potential viruses, but does not allow recovery. Other virus detection programs scan for known virus signatures, but cannot detect viruses that are so new that their signatures are not yet included in the virus detection program. The present disclosure overcomes the deficiencies of both the checksum/CRC and scanner/signature approaches. As is explained below, the present disclosure stores a clean snapshot 230 of the MBR in non-volatile memory and then compares the current MBR with the snapshot. If a discrepancy is found, the user has the option of booting from the snapshot, thereby recovering from a potential virus corruption of the MBR 202.

If the user, in operation 310, either fails to identify the current booting MBR 202 as "clean", or chooses not to save a snapshot of the MBR 202, then the BIOS 196 simply executes, in operation 303, the current boot record 220 in main memory. 150. In the alternative embodiment that performs a single query in operation 310, operation 303 is executed if the user indicates in operation 310 that he does not wish to save a snapshot 230. If, however, the user has indicated in operation 310 that it is desired, and safe, to create a snapshot 230, then the BIOS executes operation 311.

In operation 311, the BIOS 196 saves a copy of the clean MBR 202 to non-volatile memory 192 to create a snapshot 230. (This operation is reflected as data transfer 250 in FIG. 2). As stated above, the non-volatile memory 192 may be flash RAM or any other type of non-volatile storage medium, including a separate storage medium used exclusively for the purpose of storing snapshots 230a–230n. The snapshot 230 is associated with the serial number obtained in operation 305. After a snapshot 230 corresponding to the hard disk 152 or other fixed media is stored in non-volatile memory 192, the BIOS 196 executes the current boot record 220 in operation 303.

Regarding storage of the snapshot in operation 311, it should be noted that a snapshot 230a–230n may be saved for each of several multiple hard disks 152a–152n. In at least one embodiment, the BIOS 196 queries the user in operation 311 for a meaningful name to also be associated with the snapshot, in addition to the serial number. This allows the user to identify the different disks for which a snapshot is saved in non-volatile memory. If the user later wishes to free up a portion of nonvolatile memory 192 by deleting snapshots 230 for hard disks 152 he is no longer interested in, then the logical name associated with the snapshot enables the user to choose the particular snapshot 230 he wishes to delete. In another embodiment, the BIOS 196 does not query the user for a meaningful name to be associated with the booting hard disk 152. Instead, when the user wishes to see a list of hard disks 152a–152n that a snapshot 230a–230n is saved for, the BIOS 196 displays the serial number obtained in operation 305, along with other information obtained from the hard disk via I/O commands in operation 305. In various embodiments, this display information includes drive type, drive size, and manufacturer name.

Processing for a hard disk 152 or other fixed media that is not newly installed begins with operation 307. As is discussed above, in operation 307 the BIOS 196 determines whether a snapshot 230 corresponding to the serial number of the hard drive 152 has been found. If so, then operation 312 is performed. In operation 312, it is determined whether there are any relevant discrepancies between the current boot record 220 and the snapshot 230 associated with the current boot record 220. In the case of an MBR 202 (but not a floppy disk boot sector 204), the boot record contains two types of information. The first type of information has to do with how the hard disk 152 is partitioned. The second type of information is the code that is executed during IPL. The user can legitimately change the first type of information from one boot to the next. For instance, the user may wish to change the number of partitions, sizes of partitions, or the designation of which partition is the active partition and should be booted from. For these types of legitimate changes, it is undesirable to detect and report that a possible virus corruption has occurred. For this reason, in operation 312 the BIOS 196 determines whether there is a mismatch between the current boot record 220 and the snapshot 230 relating to the second type of information: the IPL code.

If it is determined in operation 312 that a relevant change has not occurred to the contents of the current boot record, then the current boot record is executed in operation 303. However, if it is determined in operation 312 that a relevant change has occurred to the contents of the current boot record 220, then control proceeds: to operation 313. In operation 313, the BIOS 196 informs the user that a mismatch exists, indicating that a possible virus corruption has occurred. In operation 314, the BIOS queries the user to determine whether the user wishes to proceed with booting from the potentially corrupted current boot record 220. If so, then control proceeds to operation 315.

A user may wish to proceed to operation 315 whenever the user is aware of, and accepts, the change reflected in the current boot record 220. This might occur, for instance, when a user has newly installed a boot management program such as IBM's Boot Manager™.

In operation 315 the BIOS 196 queries whether the user wishes to update the snapshot to reflect the contents of the current boot record 220, because the user has chosen to boot from the current boot record 220 rather than from the snapshot 230. If so, then control proceeds to operation 311, wherein the snapshot 230 is overwritten with a copy of the current boot record 220. The BIOS 196 then performs operation 303, wherein the current boot record 220 is executed.

If the BIOS 196 determines in operation 315 that the user does not wish to overwrite the snapshot 230 with a copy of the current boot record 220, then the current boot record is executed in operation 303. In this case, there remain relevant differences between the current boot record and the snapshot. Therefore, on the next boot, the BIOS 196 will likely notify the user, in operation 313, that the mismatch continues to exist.

If it is determined from the query in operation 314 that the user does not wish to proceed with booting from the current boot record 220 when a relevant change has occurred in the contents of the current boot record 220, then operation 316 is performed. In operation 316, the snapshot 230 is loaded into the current boot record 220 in main memory 150. In this manner, "recovery" is accomplished because the current record 220 is restored with the contents of the clean snapshot 230. This operation is reflected as data transfer 216 in FIG. 2.

After the current boot record is restored in operation 316, the BIOS 196 executes operation 317. In operation 317, the BIOS 196 queries the user. Specifically, the BIOS 196 determines whether the user wishes to restore the MBR 202 with a copy of the snapshot 230. If the user indicates that he does not desire such restoration, then the newly restored current boot record 220 is executed in operation 303, but the MBR 202 on the hard drive 152 is not restored.

If the user determines in operation 317 that he wishes to restore the MBR 202 on the hard disk, then the BIOS 196 executes operation 318. At the beginning of operation 318, the current boot record 220 reflects the contents of the snapshot 230 due to data transfer 216 (FIG. 2) that occurred in operation 317. In operation 318, the contents of the current boot record 220 (which contains a copy of the clean snapshot) is copied to the MBR 202 on the hard disk 152. In this manner, the MBR 202 is restored with the contents of the clean snapshot 230. This operation is reflected as data transfer 218 in FIG. 2. The current boot record 220 is then executed in operation 303.

Figure 4:
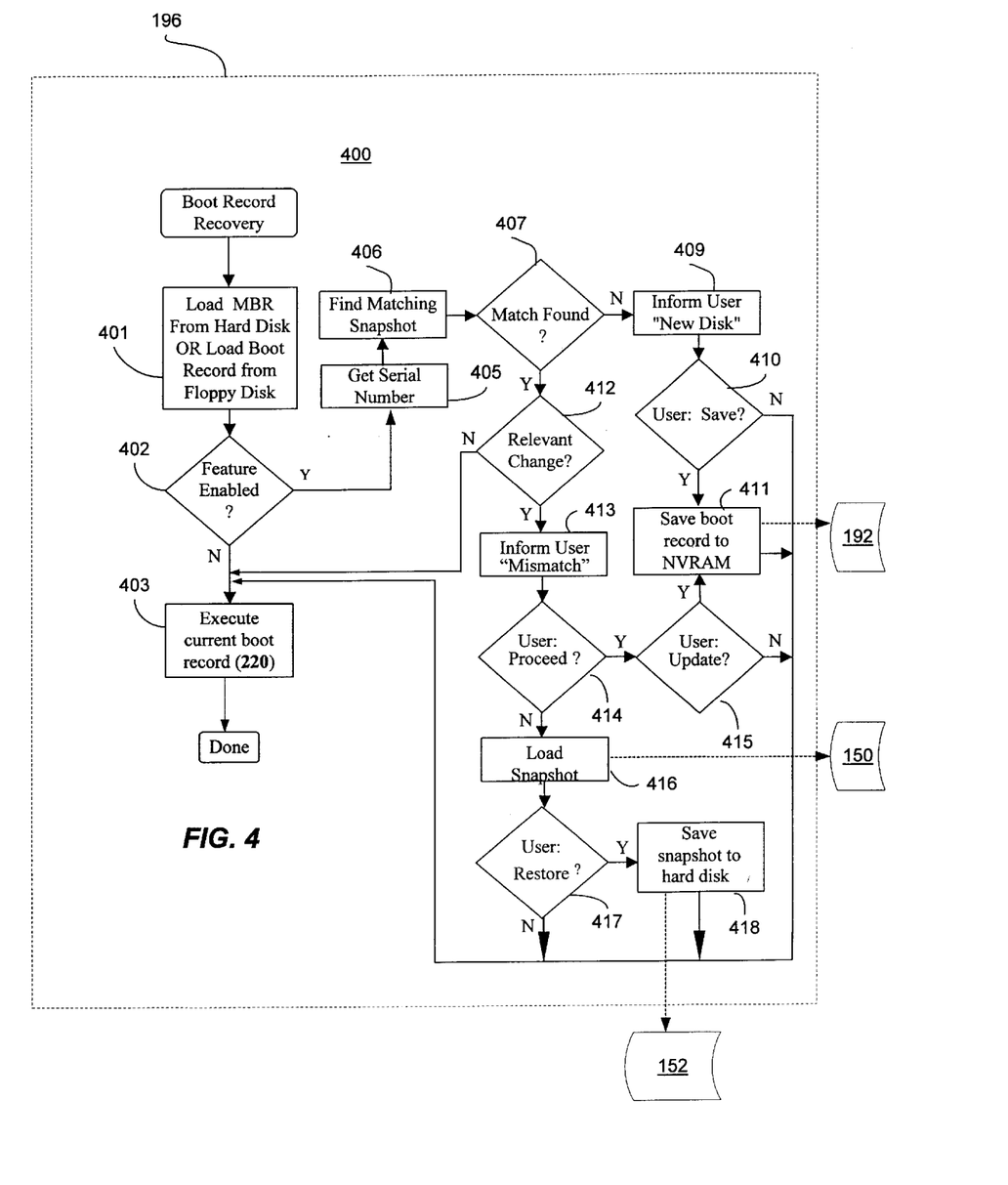
FIG. 4 is a flow chart illustrating boot sector recovery according to at least one embodiment.

FIG. 4, in conjunction with FIG. 2, illustrates an embodiment 400 of the present disclosure that provides for recovery of both the MBR 202 and the boot record 204 for a floppy disk or other removable media. This differs from the embodiment 300 illustrated in FIG. 3 in that the FIG. 4 embodiment 400 allows recovery of boot sectors on floppy disks and other removable media. Because the embodiments reflected in FIGS. 3 and 4 are very similar, only the differences between the two embodiments 300, 400 will be discussed herein. Unless noted, all other functionality between the two embodiments 300, 400 is substantially the same.

FIGS. 1 through 4 illustrate that, in contrast to the FIG. 3 embodiment 300, the FIG. 4 embodiment 400 does not perform operation 304 to determine whether the computer system 100 is being booted from a hard disk 152 or other fixed media. Instead, the FIG. 4 embodiment 400 performs virus detection and recovery for MBR's 202 on hard disks 152 and other fixed media as well as boot sectors 204 of floppy disk disks 240 and other removable media. One skilled in the art will recognize that, although FIG. 2 illustrates only one floppy disk boot sector 204, any number of different floppy disks or removable media may be inserted into the A: drive 240 of a computer system 100. Because the FIG. 4 embodiment 400 is capable of saving snapshots 230 of each of the boot records 204 for these various disks, the computer system 100 must have sufficient non-volatile memory 192 to store multiple removable boot sectors 204.

In operation 405, the BIOS 196 polls the booting device for identification information. The booting device may be either a floppy disk 240 (or other removable media) or a hard disk 152 (or other fixed media). In the case of a removable media boot, the identification information, such as a serial number, is obtained from the removable media 240 inserted into the removable media drive. This processing allows the detection and recovery module 400 to perform properly when the user boots from one of several different removable medias. In operation 406, the BIOS 196 searches a particular portion of non-volatile memory 192 to determine whether a snapshot image 230 of the boot record, whether it is an MBR 202 or a boot sector 204, has been previously stored in the non-volatile memory 192.

In operation 407, the BIOS 196 determines whether a matching snapshot 230 corresponding to the identification information of the booting device has been found. If the BIOS 196 has not located a snapshot 230 corresponding to the identification on the booting media, then the booting media is assumed to be new. In such case, the BIOS 196, in operation 409, displays a message to the user of the computer system 100 (FIG. 1) to notify the user that the current booting media is "new" and does not have a corresponding snapshot stored in non-volatile memory 192.

In operation 410, the BIOS 196 queries the user to determine whether the user knows that the booting media, be it a removable or fixed media, is virus-free. This information is relevant to the detection and recovery module's 400 ability to perform recovery of corrupted boot records. The above discussion of operations 307, 310, 311, 312, 312, 313, 314, 315, 316, 317, and 318 discuss the detection and recovery module 300 as it applies to Master Boot Records. It will be understood that operations 407, 410, 411, 412, 412, 413, 414, 415, 416, 417, and 418 operate in a substantially identical fashion, except that they perform the processing on the boot record for the booting media, where the booting media can be either fixed or removable.

In summary, the detection and recovery modules 300, 400 perform boot record recovery as follows. The detection and recovery modules 300, 400 take a snapshot of the boot record for the booting media. In one embodiment 300, detection and recovery is performed only if the booting media is fixed. In such case, a snapshot is taken of the Master Boot Record for the booting media. In a second embodiment 400, detection and recovery is performed when the booting media is fixed and also when the booting media is removable. The snapshot is only taken if it is determined that the boot record is a virus-free "clean" boot record. The BIOS 196 compares the current boot record with the corresponding snapshot 230 to determine if relevant differences exist between the two. If there are differences, the BIOS 196 reports the discrepancy to the user, whereupon the user may opt to boot from (optionally updating the snapshot) the modified boot record, or boot from (optionally restoring the boot record) the stored snapshot. This method allows boot manager programs to work correctly while still providing a mechanism to thwart rogue programs.

The detection and recovery module 300, 400 can support new media installations, multiple fixed media, and multiple removable media by maintaining identification information, such as serial numbers, with the snapshots.

The detection and recovery module 300 allows boot manager programs to change the partition table on fixed media without reporting the change as a corruption. To do this, the detection and recovery module 300 only reports changes in "relevant" data in the boot record; that is, changes in code are reported but changes in partition data are not reported.

Alternative Embodiments

Other embodiments are within the scope of the following claims. For example, while the operations depicted in FIG. 3 and FIG. 4 have been depicted to occur in sequential order, one skilled in the art will recognize that the operations need not necessarily flow in the exact order depicted. The operations may be performed in any order that preserves the functionally described herein.

Also, for example, an alternative embodiment could dispense with the query in operations 310 and 410. Rather than querying the user each time a new boot disk is encountered, the BIOS 196 could consult an input provided by the user to the setup program of the BIOS 196. In the BIOS setup program, the user can enter an input directing the BIOS 196 to automatically make a snapshot of the boot record 202, 204 any time a new boot media is encountered.

While particular embodiments of the present disclosure have been shown and described, it will be recognized to those skilled in the art that, based upon the teachings herein, further changes and modifications may be made without departing from this disclosure and its broader aspects, and thus, the appended claims are to encompass within their scope all such changes and modifications as are within the true spirit and scope of this disclosure.

What is claimed is:

1. A method of operating a computer system, comprising:
determining whether a boot record is virus-free;
identifying the boot record as a clean boot record if the boot record is determined to be virus-free;
storing a copy of the clean boot record in an identified non-volatile memory to create a snapshot, the storing being in a separate storage medium exclusively for the snapshot;
comparing the contents of a current boot record with the snapshot to determine whether a mismatch exists;
executing the contents of the current boot record if the mismatch does not exist; and
optionally selecting between updating the current boot record and restoring the clean boot record if the mismatch exists.

2. The method recited in claim 1 wherein the determining whether a boot record is virus-free further comprises receiving a user input.

3. The method recited in claim 1 wherein the contents of the current boot record reside in a volatile memory.

4. The method recited in claim 1 further comprising:
reporting a message if the mismatch exists.

5. The method recited in claim 1 further comprising:
executing the contents of the snapshot if the mismatch exists.

6. The method recited in claim 1 further comprising:
receiving a proceed indicator if the mismatch exists, the proceed indicator containing one of a plurality of selection values, the plurality of selection values including a first selection value and a second selection value;
executing the contents of the snapshot if the proceed indicator contains the first selection value; and
executing the contents of the current boot record if the proceed input contains the second selection value.

7. The method recited in claim 1 further comprising:
copying the contents of the snapshot to the current boot record if the mismatch exists.

8. The method recited in claim 1 further comprising:
copying the contents of the snapshot to the boot record if the mismatch exists.

9. The method recited in claim 1 further comprising:
receiving a proceed indicator if the mismatch exists, the proceed indicator containing one of a plurality of selection values, the plurality of selection values including a first selection value and a second selection value; and
overwriting the contents of the snapshot with the contents of the current boot record if the proceed indicator contains the first selection value.

10. The method recited in claim 1 further comprising:
receiving a proceed indicator if the mismatch exists, the proceed indicator containing one of a plurality of selection values, the plurality of selection values including a first selection value and a second selection value; and
overwriting the contents of the boot record with the contents of snapshot if the proceed indicator contains the first selection value.

11. A computer system that performs virus detection and recovery, comprising:
a processor; and
a basic input/output system (BIOS) memory coupled to the processor, the BIOS memory including:
a module that determines whether a boot record is virus-free;
a module that identifies the boot record as a clean boot record if the boot record is determined to be virus-free;
a module that stores a copy of the clean boot record in an identified non-volatile memory to create a snapshot, the storing being in a separate storage medium exclusively for the snapshot;
a module that compares the contents of a current boot record with the snapshot to determine whether a mismatch exists;
a module that executes the contents of the current boot record if the mismatch does not exist; and
a module that provides an option to select between updating the current boot record and restoring the clean boot record if the mismatch exists.

12. The computer system recited in claim 11 wherein the module that determines whether a boot record is virus-free further receives a user input.

13. The computer system recited in claim 11 wherein the contents of the current boot record resides in a volatile memory.

14. The computer system recited in claim 11 wherein the BIOS memory further includes:
a module that reports a message if the mismatch exists.

15. The computer system recited in claim 11, wherein the BIOS memory further includes:
a module that executes the contents of the snapshot if the mismatch exists.

16. The computer system recited in claim 11, wherein the BIOS memory further comprises:
a module that receives a proceed indicator if the mismatch exists, the proceed indicator containing one of a plurality of selection values, the plurality of selection values including a first selection value and a second selection value;
a module that executes the contents of the snapshot if the proceed indicator contains the first selection value; and
a module that executes the contents of the current boot record if the proceed input contains the second selection value.

17. The computer system recited in claim 11, wherein the BIOS memory further comprises:
a module that copies the contents of the snapshot to the current boot record if the mismatch exists.

18. The computer system recited in claim 11, wherein the BIOS memory further comprises:
module that copies the contents of the snapshot to the current boot record if the mismatch exists.

19. The computer system recited in claim 11, wherein the BIOS memory further comprises:
a module that receives a proceed indicator if the mismatch exists, the proceed indicator containing one of a plurality of selection values, the plurality of selection values including a first selection value and a second selection value; and
a module that overwrites the contents of the snapshot with the contents of the current boot record if the proceed indicator contains the first selection value.

20. The computer system recited in claim 11, wherein the BIOS memory further comprises:
a module that receives a proceed indicator if the mismatch exists, the proceed indicator containing one of a plurality of selection values, the plurality of selection values including a first selection value and a second selection value; and
a module that overwrites the contents of the boot record with the contents of the snapshot if the proceed indicator contains the first selection value.

21. An apparatus that performs virus detection and recovery, comprising:
a computer-readable medium having a computer program accessible therefrom, the computer program comprising:
a module that determines whether a boot record is virus-free;
a module that identifies the boot record as a clean boot record if the boot record is determined to be virus-free;
a module that stores a copy of the clean boot record in an identified non-volatile memory to create a snapshot, the storing being in a separate storage medium exclusively for the snapshot;
a module that compares the contents of a current boot record with the snapshot to determine whether a mismatch exists;
a module that executes the contents of the current boot record if the mismatch does not exist; and a module that provides an option to select between updating the current boot record and restoring the clean boot record if the mismatch exists.

22. The apparatus recited in claim 21, wherein the module that determines whether a boot record is virus free further comprises a module that receives a user input.

23. The apparatus recited in claim 22, wherein the computer-readable medium is a BASIC input/output system memory.

24. The apparatus recited in claim 21, wherein the contents of the current boot record reside in a volatile memory.

25. The apparatus recited in claim 24, wherein the computer-readable medium is a BASIC input/output system memory.

26. The apparatus recited in claim 21, wherein the computer program further comprises:

a module that reports a message if the mismatch exists.

27. The apparatus recited in claim 26, wherein the computer-readable medium is a BASIC input/output system memory.

28. The apparatus recited in claim 21, wherein the computer program further comprises:

a module that executes the contents of the snapshot if the mismatch exists.

29. The apparatus recited in claim 28, wherein the computer-readable medium is a BASIC input/output system memory.

30. The apparatus recited in claim 21, wherein the computer program further comprises:

a module that receives a proceed indicator if the mismatch exists, the proceed indicator containing one of a plurality of selection values, the plurality of selection values including a first selection value and a second selection value;

a module that executes the contents of the snapshot if the proceed indicator contains the first selection value; and a module that executes the contents of the current boot record if the proceed input contains the second selection value.

31. The apparatus recited in claim 30, wherein the computer-readable medium is a BASIC input/output system memory.

32. The apparatus recited in claim 21, wherein the computer program further comprises:

a module that copies the contents of the snapshot to the current boot record if the mismatch exists.

33. The apparatus recited in claim 32, wherein the computer-readable medium is a BASIC input/output system memory.

34. The apparatus recited in claim 21, wherein the computer program further comprises:

a module that overwrites the contents of the snapshot with the contents of the current boot record if the mismatch exists.

35. The apparatus recited in claim 34, wherein the computer-readable medium is a BASIC input/output system memory.

36. The apparatus recited in claim 21, wherein the computer-readable medium is a BASIC input/output system memory.

37. The apparatus recited in claim 21, wherein the computer-readable medium includes any of a magnetic storage medium, including disk and tape storage medium; an optical storage medium, including compact disk memory and a digital video disk storage medium; a nonvolatile memory storage memory; a volatile storage medium; and data transmission medium including packets of electronic data and electromagnetic waves modulated in accordance with the instructions.

* * * * *